April 25, 1961     A. E. PARKER     2,981,504
FUSELAGE BLADE SEALING USING CONICAL SURFACES
Filed March 13, 1959     2 Sheets-Sheet 1

INVENTOR.
ALBERT E. PARKER
BY
*Thalcer J. Jason*
ATTORNEY

April 25, 1961  A. E. PARKER  2,981,504
FUSELAGE BLADE SEALING USING CONICAL SURFACES
Filed March 13, 1959  2 Sheets-Sheet 2
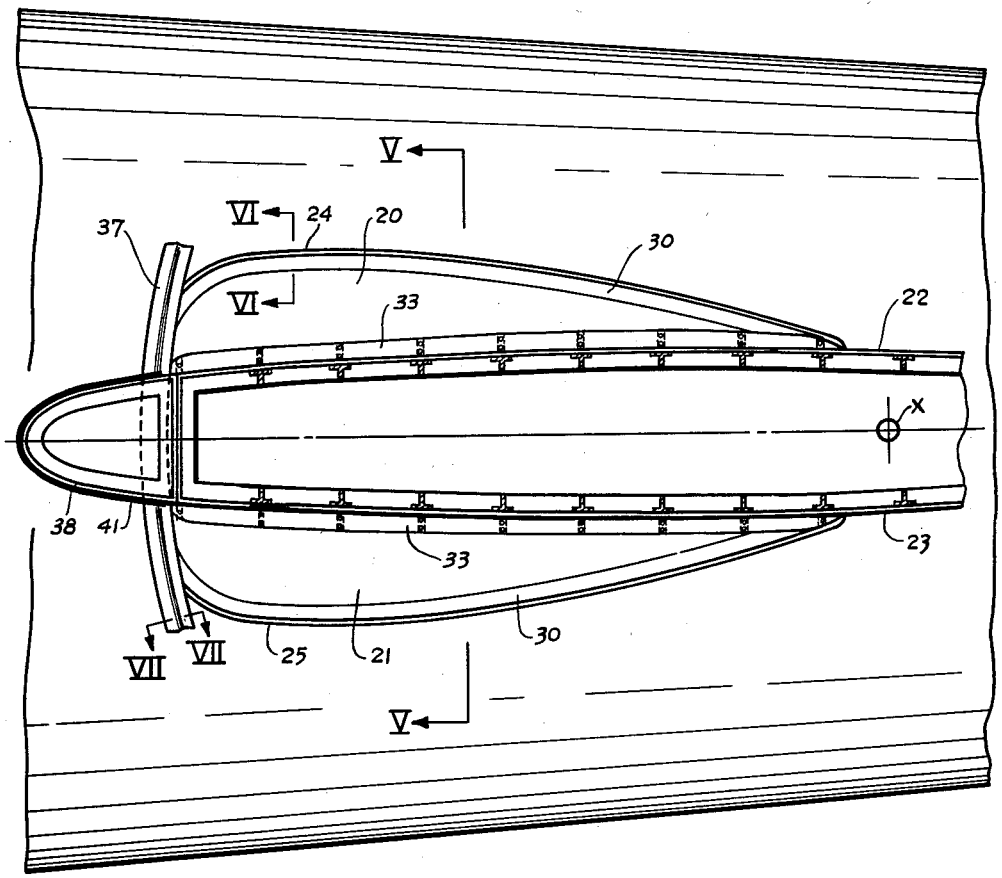
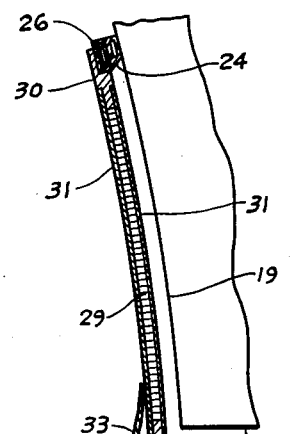
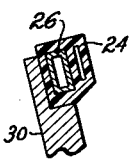
INVENTOR.
ALBERT E. PARKER
BY
ATTORNEY.

United States Patent Office 2,981,504
Patented Apr. 25, 1961

2,981,504

FUSELAGE BLADE SEALING USING CONICAL SURFACES

Albert E. Parker, San Diego, Calif., assignor to General Dynamics Corporation, San Diego, Calif., a corporation of Delaware Filed Mar. 13, 1959, Ser. No. 799,300

8 Claims. (Cl. 244—117)

The present invention relates generally to closure structure and apparatus for use on aircraft, and more particularly relates to closure means employed at the juncture of fuselage and movable control surfaces.

Many of today's aircraft, such as jet transports, fly at high subsonic speeds, that is, in the range of Mach number 0.9 to 0.99. It has been found that at such speeds ordinary aircraft control surfaces lose, or have already lost, their effectiveness. To meet this difficulty some aircraft utilize increased area control surfaces movable in their entirety at high speeds, but including a smaller movable portion for use at relatively low speeds.

Some aircraft, for instance, use a horizontal stabilizer that forms a complete and movable control surface by itself, while at the same time including smaller hinged elevators. The stabilizer is disposed through the aircraft fuselage and protrudes through openings in the side walls on each side thereof. The openings are necessarily larger than the stabilizer positioned therein in order to permit movement of the stabilizer. This produces gaps at the juncture of fuselage and stabilizer which considerably disrupt flight airflow in the area.

An object of the present invention is to provide closure structure and apparatus for eliminating these gaps and improving flight airflow in the area.

Another object is to provide closure structure and apparatus adapted to cover the fuselage side wall openings at varying attitudes of the control surface and during movement thereof.

Still other objects and features of the present invention will be readily apparent to those skilled in the art from the following specification and appended drawings wherein is illustrated a preferred form of the invention, and in which:

Figure 4 is a cross sectional view taken along line IV—IV of Figure 3 looking inboard toward the fuselage;

Figure 5 is a cross section of one of the blade members taken along line V—V of Figure 4;

Figure 6 is a cross sectional view of the seal element taken along line VI—VI of Figure 4; and Figure 7 is a cross sectional view of the shield strip taken along line VII—VII of Figure 4.

Figure 1:
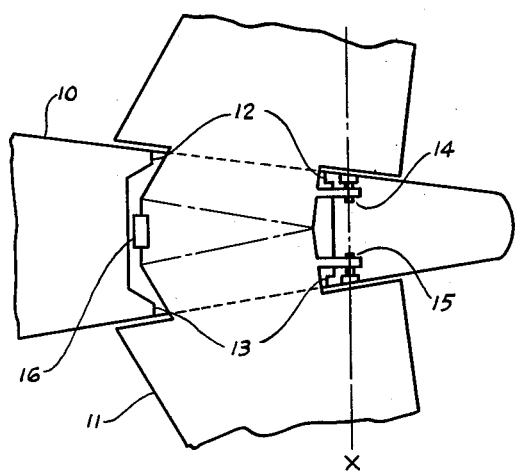
Figure 1 is a diagrammatic showing of an aircraft tail section having a movable horizontal stabilizer.

Referring now to Figure 1 of the drawings, an aircraft tail portion is diagrammatically shown therein as comprised of a fuselage 10 and horizontal stabilizer 11. The stabilizer is disposed through fuselage 10 and protrudes from side wall openings 12 and 13 on each side thereof. Stabilizer 11 is pivotally connected to the fuselage at points 14 and 15 which lie on a pivot axis X. An actuator linkage 16 within the fuselage is connected to stabilizer 11 to pivot the stabilizer up and down as desired.

The fuselage openings 12 and 13 must be larger than the stabilizer disposed therethrough to permit this up and down movement about pivot axis X. The curved outer surface of the fuselage however makes it difficult to seal or close openings 12 and 13 while allowing movement of the stabilizer. This problem is solved by the closure structure and apparatus comprising the instant invention.

Figure 3:
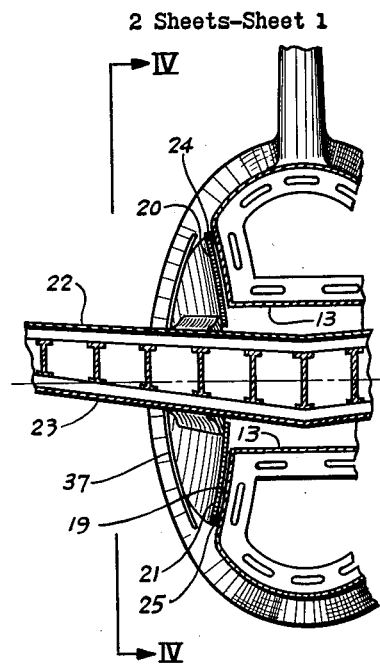
Figure 3 is a cross section view taken along line III—III of Figure 2.
Figure 2:
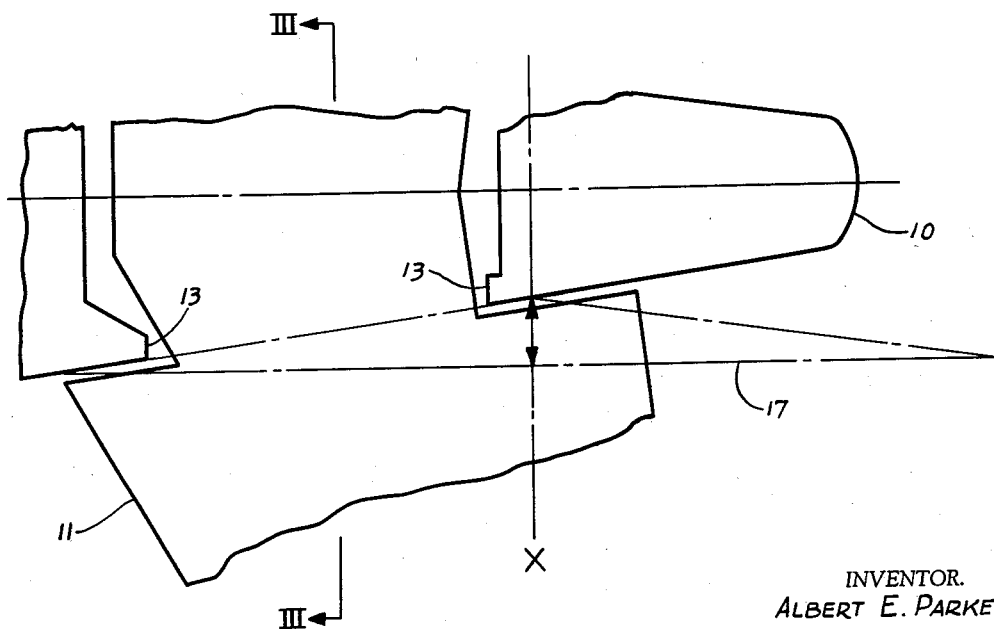
Figure 2 is a diagrammatic view of a portion of Figure 1 with the outline of a cone superimposed thereon.

The fuselage surface area immediately adjacent each opening is made a portion of a cone which is disposed as shown in Figure 2 and indicated by numeral 17. The axis, or axis of generation, of cone 17 is coincident with the pivot axis X of the horizontal stabilizer. Thus the openings 12 and 13 each lie in a concave surface that is a portion of a cone, as can be clearly seen from the cross sectional view of Figure 3.

Blade members 20 and 21 are attached to the upper and lower surfaces 22 and 23 of stabilizer 11 and are positioned immediately adjacent the fuselage in the area around opening 13. Each blade member is urged into contact with and lies substantially adjacent a conical surface 19 of the fuselage so that the blade members themselves are each a segment of a cone. Since the stabilizer (and blade member) pivot axis is also the axis of the conical fuselage surface 19, then movement of the stabilizer causes the blade members to act as segments of a cone rotating inside another cone. The blade members thus substantially close off opening 13 during movement of and at varying attitudes of the horizontal stabilizer. An identical structure and apparatus, not shown in the drawings, is used to close off opening 12 on the other side of the aircraft fuselage.

To eliminate metal to metal contact, and to increase the efficiency of the closure, blade members or flanges 20 and 21 each utilize a resilient seal element. Thus, a rubber seal element 24 is secured to the edge or periphery of blade member 20 and a rubber seal element 25 is similarly secured to blade member 21. Each of these rubber seals protrudes from its associated blade member toward the aircraft fuselage so that while the blade members lie substantially adjacent thereto they do not make contact therewith due to the rubber seal disposed therebetween. The cross section view of seal element 24, as illustrated in Figure 5, shows the seal as having two hollow ducts running therethrough and lying parallel to each other. One of the ducts having a tubular metal wall 26 in which screws may be secured to fasten seal element 24 to the blade member 20.

Blade member 20 generally consists of honeycomb material 29 fixed in a supporting frame 30 and covered with a metallic surface skin 31 to form a relatively thin and pliable panel capable of conforming to the fuselage conical segment contour. A plurality of angle studs 32 are fastened to the horizontal stabilizer 11 and form the structure to which the blade members are attached. A fairing skin strip 33 is disposed to cover studs 32, and these skin strips and blade members are secured to studs 32 by appropriate bolts and nuts 34 and 35. A plurality of washers 36 are placed on the bolts 34 between studs and blades to provide a means by which the blade to fuselage spacing can be varied as desired. The amount of pressure on the seal elements can also be varied by addition and removal of washers 36. While the aircraft is flying, this pressure on the seal elements helps keep high speed air from between the blade members and fuselage where it might tend to damage the blade members or even rip them completely off.

As an added precaution however, a shield strip 37 is attached to the fuselage 10 immediately adjacent the leading edges of blade members 20 and 21. A portion of shield strip 37 bends away from the fuselage and curls over these leading edges, thus insuring that the blade members will not be damaged nor their operation impaired.

The leading edge 38 of the horizontal stabilizer lies forward of shield strip 37 and has a resilient seal element 41 attached thereto and disposed between the fuselage and stabilizer to minimize disturbance of the desired airflow in the area. Seal element 41 contacts the forward portion of conical fuselage surface area 19 where the concave curvature is very slight and almost flat. The resiliency of seal element 41 is therefore sufficient to accommodate changes in fuselage to stabilizer spacing during movement of and at varying attitudes of the stabilizer.

The instant closure structure and apparatus employed at the juncture of fuselage and movable control surface thus achieves the objects intended. And, while certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. Closure structure and apparatus in connection with an aircraft comprising, an aircraft fuselage tail portion having an opening positioned laterally therethrough with exits on opposite sides of said fuselage tail portion, a movable horizontal stabilizer disposed through said opening and protruding from said exits on each side of said fuselage tail portion, said fuselage tail portion including a surface area about each said exit that is contoured inwardly toward said exit, said horizontal stabilizer having flanges attached thereto, said flanges disposed so as to be pressed against said contoured surfaces about said exits, said flanges wiping over said contoured surfaces as said horizontal stabilizer is moved, and an air seal provided about said exits by said flanges disposed against said contoured surfaces to minimize air leakage about said exits and substantially improve flight air flow in the aircraft tail area.

2. Closure structure and apparatus in connection with an aircraft comprising, an aircraft fuselage tail portion having a longitudinal fuselage axis, a hole disposed laterally through said fuselage tail portion with exits on opposite sides thereof, a movable horizontal stabilizer disposed through said hole and protruding from said exits on each side of said fuselage tail portion, said horizontal stabilizer having an axis of rotation which is perpendicular to said longitudinal fuselage axis, said fuselage tail portion including contoured surface areas being segments of the surfaces of cones, said contoured surface areas being segments of different cones which open outwardly away from each other and away from each side of said fuselage tail portion with their cone axes coincident with the axis of rotation of said horizontal stabilizer and flanges on said horizontal stabilizer urged into contact with said contoured surface areas and producing an air seal about said exits during various attitudes of said horizontal stabilizer.

3. Closure structure and apparatus in connection with an aircraft comprising, an aircraft fuselage tail portion having a longitudinal fuselage axis, a hole disposed laterally through said fuselage tail portion with exits on opposite sides thereof, a movable horizontal stabilizer disposed through said hole and protruding from said exits on each side of said fuselage tail portion, said horizontal stabilizer having a pivot axis perpendicular to said longitudinal fuselage axis, said fuselage tail portion including a contoured surface area about each exit, each of said contoured surface areas being a segment of a cone having its vertex and axis of generation falling on said pivot axis, and blades extending from the upper and lower surfaces of said horizontal stabilizer urged into said contoured surface areas, said blades each having a rubber seal member contacting said contoured surface, and said blades with seal members substantially closing off said exits from which said horizontal stabilizer protrudes.

4. Closure structure and apparatus in connection with an aircraft comprising, a fuselage, said fuselage having contoured side walls, said fuselage having openings in said side walls, a horizontal stabilizer pivotally secured to said fulselage and having portions thereof projecting through said side wall openings, said side walls having recesses in the area of said openings, each of said recesses being a segment of a cone having its vertex and axis of generation falling on the pivotal axis of said horizontal stabilizer, blades extending from the upper and lower surfaces of said horizontal stabilizer and urged into said recessed portions as adjacent conical surfaces thereto which substantially close off said openings during movement of and at various attitudes of inclination of said horizontal stabilizer.

5. Closure structure and apparatus in connection with an aircraft comprising, a fuselage tail portion, said tail portion having contoured side walls, said fuselage tail portion having openings in said side walls, a horizontal stabilizer pivotally secured to said fuselage tail portion and having portions thereof projecting through said side wall openings, said side walls having recesses in the immediate area of said openings, each said recess being a segment of a cone having its vertex and axis of generation falling on the pivotal axis of said horizontal stabilizer, blades secured to and extending substantially normally from the upper and lower surfaces of said horizontal stabilizer, said blades urged into said recessed conical segment portions to lie therein as adjacent conical segments themselves, said blades substantially closing off said side wall openings during movement of and at various attitudes of inclination of said horizontal stabilizer, said blades being relatively thin and pliable and comprising honeycomb sandwich panels fixed in supporting frames and covered with metallic surface skin, and each of said blades having a rubber seal member attached thereto at its periphery which seal member is urged against said recessed conical segment portions to substantially close off said side wall openings.

6. Closure structure and apparatus in connection with an aircraft comprising, a fuselage tail portion having openings in the side walls thereof, a horizontal stabilizer pivotally connected to said side wall openings, said stabilizer having a leading edge, blade elements secured to said stabilizer and adapted to cover each of said side wall openings during movement of and at various attitudes of said stabilizer, each said blade element having a resilient seal element attached thereto at its periphery, said seal elements disposed against said fuselage tail portion about said side wall openings to substantially close said openings, said blade elements and said seal elements having leading edges, a shield strip attached to each side of said fuselage tail portion substantially adjacent the leading edges of said blade elements and said seal elements, and said shield strip curling over said leading edges to afford protection thereto.

7. Closure structure and apparatus in connection with an aircraft comprising, a fuselage tail portion having openings in the side walls thereof, a movable horizontal stabilizer having a narrowed central portion extending through said fuselage tail portion and the openings in the side walls thereof, said narrowed central portion pivotally secured within said fuselage tail portion, blade elements secured to the upper and lower surfaces of said horizontal stabilizer substantially adjacent said narrowed central portion but exterior to said fuselage tail portion, each said blade element having a resilient seal attached to its periphery, said blade elements and said seals urged against said fuselage tail portion about said openings and adapted to substantially cover same, said blade elements having leading edges, a shield strip attached to each side of said fuselage tail portion substantially adjacent the leading edges of said blade elements, said shield strip curling over said leading edges to afford protection thereto, said stabilizer having a leading edge forward of its narrowed central portion and said shield strip, and a resilient seal attached to said stabilizer leading edge and arranged to substantially seal the space between said stabilizer leading edge and said fuselage tail portion.

8. Closure structure and apparatus in connection with an aircraft comprising, a fuselage tail portion having openings in the side walls thereof, a horizontal stabilizer having a narrowed central portion, said narrowed central portion extending through said fuselage tail portion and the openings in the side walls thereof, said narrowed central portion pivotally secured within said fuselage tail portion, blade elements secured to said horizontal stabilizer adapted to cover each of said side wall openings during movement of and at varying attitudes of said horizontal stabilizer, each said blade element having honeycomb sandwich panels fixed in a supporting frame and covered with a surface skin, and each of said blade elements having a rubber seal member attached thereto at its periphery which seal member is urged against said fuselage tail portion to substantially close off said side wall openings.

References Cited in the file of this patent

UNITED STATES PATENTS

| | | |
|---|---|---|
| 1,806,927 | Aldrich | May 26, 1931 |
| 2,461,669 | Wiley | Feb. 15, 1949 |
| 2,596,045 | Rogallo | May 6, 1952 |
| 2,630,986 | Gumbs | Mar. 10, 1953 |
| 2,644,777 | Havens | July 7, 1953 |
| 2,742,096 | Brady | Apr. 17, 1956 |
| 2,749,064 | Kuhlman | June 5, 1956 |